(12) United States Patent
Fu et al.

(10) Patent No.: US 11,691,626 B2
(45) Date of Patent: Jul. 4, 2023

(54) ESTIMATION OF A MINIMUM OVERTAKING SPEED OF A VEHICLE

(71) Applicant: Zenuity AB, Gothenburg (SE)

(72) Inventors: Junsheng Fu, Nödinge (SE); Marcus Olsson, Väröbacka (SE); Viktor Runemalm, Gothenburg (SE); Rafael Valencia Carreño, Kållered (SE)

(73) Assignee: Zenuity AB, Gothenburg (SE)

( * ) Notice: Subject to any disclaimer, the term of this patent is extended or adjusted under 35 U.S.C. 154(b) by 144 days.

(21) Appl. No.: 17/103,377

(22) Filed: Nov. 24, 2020

(65) Prior Publication Data
US 2021/0155247 A1    May 27, 2021

(30) Foreign Application Priority Data
Nov. 25, 2019  (EP) .................................. 19211322

(51) Int. Cl.
*B60W 30/18* (2012.01)
*G06N 3/02* (2006.01)
(Continued)

(52) U.S. Cl.
CPC .... *B60W 30/18163* (2013.01); *B60W 40/105* (2013.01); *B60W 40/12* (2013.01);
(Continued)

(58) Field of Classification Search
CPC ......... B60W 30/18163; B60W 40/105; B60W 40/12; B60W 2554/4042;
(Continued)

(56) References Cited

U.S. PATENT DOCUMENTS

| 2015/0344033 A1* | 12/2015 | Fukuda | B60W 30/16 701/117 |
| 2015/0353087 A1* | 12/2015 | Niino | B60W 50/14 701/96 |

(Continued)

OTHER PUBLICATIONS

European Search Report dated May 29, 2020 for International Application No. 19211322.3 filed on Nov. 25, 2019, consisting of 9-pages.

*Primary Examiner* — Peter D Nolan
*Assistant Examiner* — Ashley L Redhead, Jr.
(74) *Attorney, Agent, or Firm* — Christopher & Weisberg, P.A.

(57) ABSTRACT

The present disclosure relates to an overtaking estimating system for estimation of a minimum overtaking speed of a vehicle. The overtaking estimating system determines in view of a host vehicle a remaining distance of an overtaking lane contiguous to a driving lane of the host vehicle. The system further determines a delta distance between the host vehicle and a preceding vehicle positioned in the host vehicle driving lane. Moreover, the system determines a delta time for the host vehicle to reach the preceding vehicle. The system further determines, based on the delta distance, the delta time and a determined host vehicle speed, a speed of the preceding vehicle. Furthermore, the system determines, based on the remaining distance, the delta distance, the preceding vehicle speed, and an overtaking-affecting parameter, a minimum overtaking speed of the host vehicle for overtaking the preceding vehicle in the remaining distance of the overtaking lane.

12 Claims, 3 Drawing Sheets

1 Overtaking estimating system

(51) Int. Cl.
  *B60W 40/105* (2012.01)
  *B60W 40/12* (2012.01)
(52) U.S. Cl.
  CPC ....... *G06N 3/02* (2013.01); *B60W 2554/4042* (2020.02); *B60W 2554/802* (2020.02)
(58) Field of Classification Search
  CPC ..... B60W 2554/802; B60W 2050/146; B60W 2420/42; B60W 2520/10; B60W 2720/10; B60W 30/143; B60W 40/00; B60W 50/00; B60W 2050/0043; G06N 3/02
  See application file for complete search history.

(56) References Cited

U.S. PATENT DOCUMENTS

| | | | |
|---|---|---|---|
| 2018/0148061 A1* | 5/2018 | Reckziegel | B60W 50/14 |
| 2020/0160546 A1* | 5/2020 | Gu | G06T 3/0093 |

* cited by examiner

ESTIMATION OF A MINIMUM OVERTAKING SPEED OF A VEHICLE

CROSS-REFERENCE TO RELATED APPLICATION

This Application is related to and claims priority to European Patent Application No. 19211322.3, filed Nov. 25, 2019, entitled ESTIMATION OF A MINIMUM OVERTAKING SPEED OF A VEHICLE, the entirety of which is incorporated herein by reference.

TECHNICAL FIELD

The present disclosure relates to estimation of a minimum overtaking speed of a vehicle.

BACKGROUND

Prior to and/or during vehicle overtaking maneuvers, traveling environment variables may need to be considered; for instance, what speed is required, is there enough space, are there other vehicles nearby that may interfere, etc.?

Keeping up with multiple such travelling environment variables may pose a challenge, e.g. to a driver of the overtaking vehicle and/or to an ADAS/AD system thereof, and accordingly, there is a need for an approach providing assistance therewith.

SUMMARY

It is therefore an object of embodiments herein to provide an approach for in an improved and/or alternative manner estimate a minimum overtaking speed of a vehicle.

The object above may be achieved by the subject-matter disclosed herein. Embodiments are set forth in the appended claims, in the following description and in the drawings.

The disclosed subject-matter relates to a method performed by an overtaking estimating system for estimation of a minimum overtaking speed of a vehicle. The overtaking estimating system determines in view of a host vehicle a remaining distance of an overtaking lane contiguous to a driving lane of the host vehicle. The overtaking estimating system further determines a delta distance between the host vehicle and a preceding vehicle positioned in the host vehicle driving lane. Moreover, the overtaking estimating vehicle determines a delta time for the host vehicle to reach the preceding vehicle. The overtaking estimating system further determines—based on the delta distance, the delta time and a determined host vehicle speed—a speed of the preceding vehicle. Furthermore, the overtaking estimating system determines—based on the remaining distance, the delta distance, the preceding vehicle speed, and an overtaking-affecting parameter—a minimum overtaking speed of the host vehicle for overtaking the preceding vehicle in the remaining distance of the overtaking lane.

The disclosed subject-matter further relates to an overtaking estimating system for—and/or adapted for—estimation of a minimum overtaking speed of a vehicle. The overtaking estimating system comprises a remaining distance determining unit for—and/or adapted for—determining—in view of a host vehicle—a remaining distance of an overtaking lane contiguous to a driving lane of the host vehicle. The overtaking estimating system further comprises a delta distance determining unit for—and/or adapted for—determining a delta distance between the host vehicle and a preceding vehicle positioned in the host vehicle driving lane. Moreover, the overtaking estimating system comprises a delta time determining unit for—and/or adapted for—determining a delta time for the host vehicle to reach the preceding vehicle. The overtaking estimating system further comprises a preceding vehicle speed determining unit for—and/or adapted for—determining—based on the delta distance, the delta time and a determined host vehicle speed—a speed of the preceding vehicle. Furthermore, the overtaking estimating system comprises an overtaking speed determining unit for—and/or adapted for—determining—based on the remaining distance, the delta distance, the preceding vehicle speed, and an overtaking-affecting parameter—a minimum overtaking speed of the host vehicle for overtaking the preceding vehicle in the remaining distance of the overtaking lane.

Furthermore, the disclosed subject-matter relates to a vehicle comprising an overtaking estimating system as described herein.

Moreover, the disclosed subject-matter relates to a computer program product comprising a computer program containing computer program code means arranged to cause a computer or a processor to execute the steps of the overtaking estimating system described herein, stored on a computer-readable medium or a carrier wave.

The disclosed subject-matter further relates to a non-volatile computer readable storage medium having stored thereon said computer program product.

Thereby, there is introduced an approach according to which assistance is provided in gauging traveling environment variables prior to a potential vehicle overtaking situation. That is, since there is determined in view of a host vehicle a remaining distance of an overtaking lane contiguous to a driving lane of the host vehicle, there is established how much distance that remains of a current and/or upcoming overtaking lane adjacent a driving lane along which the host vehicle is positioned, driving and/or traveling. Accordingly, with the introduced concept, there is determined a distance relevant from a positon of the host vehicle of a passing lane available for overtaking. Would the host vehicle not yet have reached a beginning of the overtaking lane, then the entire length of the overtaking lane remains, whereas should the host vehicle be positioned somewhere in parallel with the overtaking lane, then merely a portion of said overtaking lane remains. Furthermore, that is, since there is determined a delta distance between the host vehicle and a preceding vehicle positioned in the host vehicle driving lane, there is established a distance between the host vehicle and a preceding vehicle positioned, driving and/or traveling ahead of the host vehicle in the host vehicle driving lane. Moreover, that is, since there is further determined a delta time for the host vehicle to reach the preceding vehicle, there is estimated the time it may take for the host vehicle to catch up with the preceding vehicle. Furthermore, that is, since there is determined—based on the delta distance, the delta time and a determined host vehicle speed—a speed of the preceding vehicle, there is established a driving speed of the preceding vehicle, as derived from the estimated distance to the preceding vehicle, the estimated time to reach the preceding vehicle and a determined vehicle speed of the host vehicle. Moreover, that is, since there is determined—based on the remaining distance, the delta distance, the preceding vehicle speed, and an overtaking-affecting parameter—a minimum overtaking speed of the host vehicle for overtaking the preceding vehicle in the remaining distance of the overtaking lane, an estimation is calculated representing a host vehicle velocity required for the host vehicle to manage overtaking the preceding vehicle before the overtaking lane ends. That is, at any given time point—considering a potential overtaking maneuver by the host vehicle at that time point or essentially at that time point—the minimum overtaking speed currently required by the host vehicle 2 may be derived from the current—or essentially current—determined remaining distance, delta distance, preceding vehicle speed and overtaking—affecting parameter, as suggested by the introduced approach. Accordingly, the overtaking estimating system assists in gauging traveling environment variables prior to a potential overtaking maneuver by the host vehicle, thus subsequently enabling for such a potential overtaking maneuver to pose less of a challenge, e.g. to a potential vehicle driver and/or an ADAS/AD system of the host vehicle For that reason, an approach is provided for in an improved and/or alternative manner estimating a minimum overtaking speed of a vehicle The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
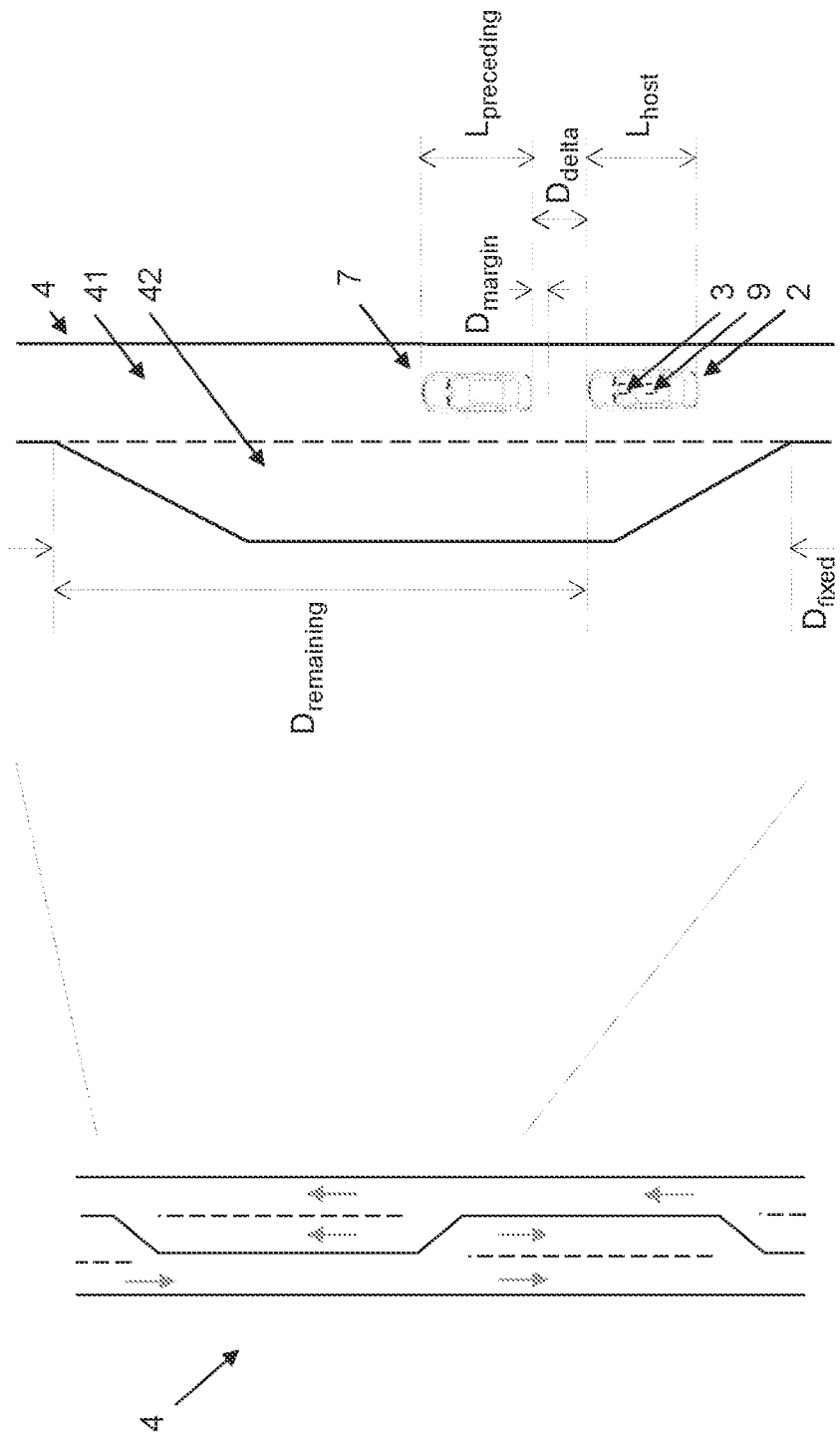
FIG. 1 illustrates a schematic view of an exemplifying overtaking estimating system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to estimation of a minimum overtaking speed of a vehicle, there will be disclosed an approach according to which assistance is provided in gauging traveling environment variables prior to a potential vehicle overtaking situation.

Referring now to the figures and FIG. 1 in particular, there is depicted a schematic view of an exemplifying overtaking estimating system 1 according to embodiments of the disclosure. The overtaking estimating system 1 is adapted for estimation of a minimum overtaking speed of a vehicle. The overtaking system 1 is provided on-board a host vehicle 2, for instance comprised therein 2.

The exemplifying host vehicle 2 may refer to any arbitrary manned or unmanned vehicle, for instance an engine-propelled or electrically-powered vehicle such as a car, truck, lorry, van, bus, tractor, motorcycle, moped, scooter or the like. According to an example, the host vehicle 2 may even refer to e.g. a hover board or bicycle or the like. Moreover, the term "vehicle" may throughout this disclosure refer to "road-traffic vehicle" and/or "road-driven vehicle", and further to "manually driven vehicle and/or at least partly autonomously driven vehicle". "Host vehicle" may refer to "ego vehicle" and/or merely "vehicle". The phrase "overtaking estimating system" may refer to "overtaking speed estimating system", "overtaking determining system", "vehicle overtaking system" and/or "passing estimating system". According to an example, "overtaking estimating system" may refer to "overtaking estimating system of, on-board and/or comprised in a vehicle". "For" estimation of a minimum overtaking speed, on the other hand, may refer to "adapted for" estimation of a minimum overtaking speed, whereas the phrase "for estimation of" a minimum overtaking speed may refer to "for determination of" a minimum overtaking speed. "Minimum" overtaking speed may refer to "requested", "balanced" and/or "needed" overtaking speed, whereas "minimum overtaking speed of a vehicle" may refer to "minimum overtaking vehicle speed", "potential minimum overtaking speed of a vehicle" and/or merely "overtaking speed of a vehicle". "Speed", on the other hand, may throughout the disclosure refer to "velocity". The phrase "for estimation of a minimum overtaking speed of a vehicle" may refer to "for estimation of a minimum overtaking speed of a vehicle prior to a potential overtaking by said vehicle" and/or to "for assisting in —and/or supporting—gauging and/or interpreting traveling environment variables prior to a potential vehicle overtaking situation". According to an example, the phrase "for estimation of a minimum overtaking speed of a vehicle" may further refer to "for estimation of a minimum overtaking speed of a vehicle positioned along a 2+1 road" and/or "for estimation of a minimum overtaking speed of a vehicle in an overtaking lane of a 2+1 road".

Further depicted in FIG. 1 is an optional exemplifying mono camera 3. The optional mono camera 3—which may be provided on-board the host vehicle 2 e.g. on an interior side of a front windshield thereof 2—may be adapted to capture surroundings such as surroundings of the host vehicle 2. Said mono camera 3 may refer to any arbitrary mono camera—e.g. commonly known—supporting image capturing and subsequently provision of image data, here of the host vehicle surroundings—or a portion thereof e.g. in a forward or essentially forward direction—as the host vehicle 2 travels along the exemplifying road 4.

"Mono camera" may refer to "monocular camera", and according to an example further to "one mono camera" and/or "single mono camera". The phrase mono camera "adapted to capture surroundings of the host vehicle", on the other hand, may refer to mono camera "adapted and/or configured to capture a portion of a surrounding of the host vehicle, e.g. at least in a forward direction".

The host vehicle 2, here an exemplifying passenger car, is positioned on—and/or is driving or traveling along—an exemplifying traffic road 4, here of an exemplifying commonly known 2+1 type, in a driving lane 41 thereof 4. The exemplifying traffic road 4 further comprises an overtaking lane 42 contiguous to the driving lane 41 of the host vehicle 2, which overtaking lane 42 here has an exemplifying fixed distance $D_{fixed}$. The optional fixed length $D_{fixed}$ of the overtaking lane 42 may be of any arbitrary dimension, e.g. ranging from a few tens of metres up to tens of thousands of metres.

The overtaking estimating system 1 is—e.g. by means of a remaining distance determining unit 101 (shown in FIG. 2)—adapted and/or configured for determining in view of the host vehicle 2 a remaining distance $D_{remaining}$ of the overtaking lane 42 contiguous to the driving lane 41 of the host vehicle 2. Thereby, there is established how much distance that remains of a current and/or upcoming overtaking lane 42 adjacent a driving lane 41 along which the host vehicle 2 is positioned, driving and/or traveling. Accordingly, with the introduced concept, there is determined a distance $D_{remaining}$ relevant from a positon of the host vehicle 2 of a passing lane 42 available for overtaking. Would the host vehicle 2 not yet have reached a beginning of the overtaking lane 42, then the entire length $D_{fixed}$ of the overtaking lane remains, whereas should the host vehicle 2 be positioned somewhere in parallel with the overtaking lane 42, then merely a portion of said overtaking lane 42 remains.

The remaining distance $D_{remaining}$ may be determined in any arbitrary manner feasible depending on which input data is available and/or the situation at hand. For instance, the remaining distance $D_{remaining}$ may be determined with input data derived from an optional—e.g. known—positioning system 5 (shown in FIG. 2) on-board the host vehicle 2 indicating the vehicle position in combination with e.g. map data comprising information of the overtaking lane 42 and/or the fixed length $D_{fixed}$ thereof 42. Additionally or alternatively, the remaining distance $D_{remaining}$ may be determined based on input data derived from an—e.g. known—image capturing system on-board the host vehicle 2, e.g. a camera, adapted to capture road sign information (not shown) along the road 4 indicating the fixed distance $D_{fixed}$ and/or a remainder of the overtaking lane 42, and the host vehicle's 2 position and/or speed in relation to said road sign. The optional image capturing system may—or may not—refer to the optional mono camera 3 discussed above. Moreover, the referred to host vehicle speed may be determined in any arbitrary manner feasible depending on which input data is available and/or the situation at hand. According to an example, the host vehicle speed may be determined based on input data from an optional—e.g. known—speed determining system 6 (shown in FIG. 2) on-board the host vehicle 2, e.g. comprising a speedometer and/or odometer, which input data indicates the host vehicle speed and may be derived by the overtaking estimating system 1.

According to an example, the following equation could serve as basis:

$$D_{remaining} = D_{fixed} V_{host} * \Delta t \quad (1)$$

where $D_{fixed}$=fixed distance of overtaking lane 42,
$V_{host}$=host vehicle speed,
$\Delta t$=delta time between two timestamps, and
$D_{remaining}$=remaining distance of overtaking lane 42

The phrase "determining" a remaining distance may refer to "calculating" and/or "deriving" a remaining distance, and according to an example further to "determining based on input derived from a positioning system on-board said host vehicle in combination with map data comprising information regarding said overtaking lane" a remaining distance, and/or "determining based on input derived from an image capturing system and/or mono camera on-board said host vehicle of a road sign indicating a fixed length and/or a remainder of said overtaking lane" a remaining distance. Moreover, "determining a remaining distance" may refer to "determining a current—or essentially current—remaining distance" and/or "determining at a time point a remaining distance". Determining "in view of a host vehicle" a remaining distance, on the other hand, may refer to determining "from a position of a host vehicle" a remaining distance, whereas remaining "distance" may refer to remaining "distance in a lengthwise direction". The expression "driving lane" may refer to "traffic lane", whereas "overtaking lane" may refer to "passing lane", "overtaking lane allowing faster-moving traffic" and/or "overtaking lane of the same direction as the driving lane of the host vehicle". "Overtaking lane" may further refer to "current and/or upcoming overtaking lane". According to an example, "overtaking lane" may further refer to "overtaking lane of —and/or having—a predetermined and/or fixed distance, extension and/or length" and/or "overtaking lane of a 2+1 road". The phrase overtaking lane "contiguous" to a driving lane, on the other hand, may refer to overtaking lane "adjacent" and/or "next to" a driving lane.

The overtaking estimating system 1 is—e.g. by means of a delta distance determining unit 102 (shown in FIG. 2)—adapted and/or configured for determining a delta distance $D_{delta}$ between the host vehicle 2 and a preceding vehicle 7 positioned in the host vehicle driving lane 41. Thereby, there is established a distance $D_{delta}$ between the host vehicle 2 and a preceding vehicle 7 positioned, driving and/or traveling ahead of the host vehicle 2 in the host vehicle driving lane 41.

The exemplifying preceding vehicle 7 may refer to any arbitrary manned or unmanned vehicle, for instance an engine-propelled or electrically-powered vehicle such as a car, truck, lorry, van, bus, tractor, motorcycle, moped, scooter or the like. According to an example, the preceding vehicle may even refer to e.g. a hover board or bicycle or the like. The delta distance $D_{delta}$ may be determined in any arbitrary manner feasible depending on which input data is available and/or the situation at hand. According to an example, the delta distance $D_{delta}$ may be determined based on input data derived from a—e.g. known—vehicle-to-vehicle communication system on-board the host vehicle 2 adapted to communicate with surrounding vehicles—such as e.g. the preceding vehicle 7—which input data indicates the distance $D_{delta}$ between the host vehicle 2 and the preceding vehicle 7.

Additionally or alternatively, however, the delta distance $D_{delta}$ may be determined based on input data derived from one or more—e.g. known—surrounding object sensing systems on-board the host vehicle 2, e.g. comprising one or more of a camera, radar, lidar and/or ultrasound sensor, adapted to detect surrounding objects—such as the preceding vehicle 7—and distance(s) $D_{delta}$ thereto.

Optionally, determining the delta distance $D_{delta}$ may comprise determining said delta distance $D_{delta}$ based on image data derived from the previously discussed mono camera 3 adapted to capture surroundings of the host vehicle 2. Thereby, the delta distance $D_{delta}$ between the host vehicle 2 and the preceding vehicle 7 may be determined in an efficient and cost effective manner, with no further surrounding objects detecting sensors needed other than said mono camera 3.

Further optionally, determining the delta distance $D_{delta}$ may comprise determining said delta distance $D_{delta}$ based on a—e.g. known—monocular depth reconstruction model. The optional monocular depth reconstruction model and/or system may for instance comprise a—e.g. known—convolutional neural network, CNN The phrase "determining" a delta distance may refer to "calculating" and/or "deriving" a delta distance, and according to an example further to "determining based on input derived from a surrounding object sensing system on-board said host vehicle" a delta distance. Moreover, "determining a delta distance" may refer to "determining a current—or essentially current—delta distance" and/or "determining at—or essentially at—said time point a delta distance". "Delta distance between said host vehicle and a preceding vehicle", on the other hand, may refer to "delta distance from said host vehicle to a preceding vehicle", and according to an example further to "delta distance between essentially a front end of said host vehicle and essentially a rear end of a preceding vehicle". Moreover, "preceding" vehicle may refer to "leading" vehicle. Preceding vehicle "positioned" in the host vehicle driving lane may refer to "preceding" vehicle "traveling and/or driving" in the host vehicle driving lane and/or preceding vehicle "positioned ahead" in the host vehicle driving lane, whereas "said host vehicle driving lane" may refer to "said driving lane of the host vehicle".

The overtaking estimating system 1 is—e.g. by means of a delta time determining unit 103 (shown in FIG. 2)—adapted and/or configured for determining a delta time for the host vehicle 2 to reach the preceding vehicle 7. Thereby, there is estimated the time it may take for the host vehicle 2 to catch up with the preceding vehicle 7.

The delta time may be determined in any arbitrary manner feasible depending on which input data is available and/or the situation at hand. According to an example, the delta time may be determined based on input data derived from the exemplifying previously discussed optional one or more surrounding object sensing systems.

Optionally, however, determining the delta time may comprise determining said delta time based on image data derived from the previously discussed mono camera 3 adapted to capture surroundings of the host vehicle 2. Further optionally, determining the delta time may comprise determining said delta time based on image data—derived from the previously discussed mono camera 3—captured at two or more different points in time. Thereby, the delta time for the host vehicle 2 to reach the preceding vehicle 7 may be determined in an—e.g. known—efficient and cost effective manner, with no further surrounding objects detecting sensors needed other than said mono camera 3.

The phrase "determining" a delta time may refer to "calculating" and/or "deriving" a delta time, and according to an example further to "determining based on input derived from a surrounding object sensing system on-board said host vehicle" a delta time. Moreover, "determining a delta time" may refer to "determining a current—or essentially current—delta time" and/or "determining at—or essentially at—said time point a delta time", whereas "delta time for said host vehicle to reach" the preceding vehicle according to an example may refer to "time-to-reach" the preceding vehicle. Delta time for "the host vehicle to reach" the preceding vehicle, on the other hand, may refer to delta time for "the host vehicle to catch up with" the preceding vehicle, and according to an example further to delta time for "essentially a front end of said host vehicle to reach essentially a rear end of" the preceding vehicle. Moreover, "image data captured at two or more different points in time" may refer to "image data captured at two or more different timestamps". The different points in time may differ by any time duration feasible for the implementation and/or situation at hand, for instance ranging from a few microseconds up to several seconds in between the time stamps.

The overtaking estimating system 1 is—e.g. by means of a preceding vehicle speed determining unit 104 (shown in FIG. 2)—adapted and/or configured for determining—based on the delta distance $D_{delta}$, the delta time and a determined host vehicle speed—a speed of the preceding vehicle 7. Thereby, there is established a driving speed of the preceding vehicle 7, as derived from the estimated distance $D_{delta}$ to the preceding vehicle 7, the estimated time to reach the preceding vehicle 7 and a determined vehicle speed of the host vehicle 2.

The host vehicle speed may be determined in any arbitrary manner feasible depending on which input data is available and/or the situation at hand. Said host vehicle speed may for instance be derived from the optional exemplifying speed determining system 6 discussed above.

The preceding vehicle speed, on the other hand, may be derived from the determined delta distance $D_{delta}$, the determined delta time and the determined host vehicle speed, in any feasible manner.

According to an example, the following equation(s) could serve as basis:

$$(V_{host} - V_{preceding}) * T_{delta} = D_{delta} \qquad (2)$$

$$V_{preceding} = -D_{delta}/T_{delta} + V_{host} \qquad (3)$$

where
$V_{host}$=host vehicle speed,
$T_{delta}$=delta time for host vehicle to reach preceding vehicle 7,
$D_{delta}$=delta distance between host vehicle 2 and preceding vehicle 7, and
$V_{preceding}$=preceding vehicle speed As previously discussed, the delta distance $D_{delta}$ between the host vehicle 2 and the preceding vehicle 7 may optionally be computed with support from a monocular depth reconstruction model, e.g. with a CNN-based approach.

The phrase "determining based on said delta distance, said delta time and a determined host vehicle speed" a speed of the preceding vehicle may refer to "determining based on equations and/or algorithms comprising said delta distance, said delta time and a determined host vehicle speed" a speed of the preceding vehicle. "Determining based on", on the other hand, may in this context refer to "calculating based on". Moreover, "determining a speed of the preceding vehicle" may refer to "determining a current—or essentially current—speed of the preceding vehicle" and/or "determining at—or essentially at—said time point a speed of the preceding vehicle". A "determined host vehicle speed", on the other hand, may refer to a "derived host vehicle speed", and further according to an example to a "host vehicle speed derived from a speed determining system on-board said vehicle".

The overtaking estimating system 1 is—e.g. by means of a overtaking speed determining unit 105 (shown in FIG. 2)—adapted and/or configured for determining—based on the remaining distance $D_{remaining}$, the delta distance $D_{delta}$, the preceding vehicle speed, and an overtaking-affecting parameter—a minimum overtaking speed of the host vehicle 2 for overtaking the preceding vehicle 7 in the remaining distance $D_{remaining}$ of the overtaking lane 42. Thereby, an estimate is calculated representing a host vehicle velocity required for the host vehicle 2 to manage overtaking the preceding vehicle 7 before the overtaking lane 42 ends. That is, at any given time point—considering a potential overtaking maneuver by the host vehicle 2 at that time point or essentially at that time point—the minimum overtaking speed currently required by the host vehicle 2 may be derived from the current—or essentially current—determined remaining distance $D_{remaining}$, delta distance $D_{delta}$, preceding vehicle speed and overtaking-affecting parameter, as suggested by the introduced approach. Accordingly, the overtaking estimating system assists in gauging traveling environment variables prior to a potential overtaking maneuver by the host vehicle 2, thus subsequently enabling for such a potential overtaking maneuver to pose less of a challenge, e.g. for a potential vehicle driver and/or an ADAS/AD system of the host vehicle 2.

The overtaking-affecting parameter may refer to any arbitrary parameter providing a margin in the determination of the minimum overtaking speed.

Optionally, the overtaking-affecting parameter may comprise a length $L_{host}$ of the host vehicle 2. The host vehicle length $L_{host}$ may be represented by a constant; according to an example however, the host vehicle length $L_{host}$ may be represented by a variable, e.g. derivable from a—e.g. known—vehicle equipage length determining system 8 (shown in FIG. 2) e.g. on-board the host vehicle 2, which for instance may be relevant should the host vehicle 2 have attached and/or have on tow e.g. a trailer, semi-trailer and/or caravan.

Additionally or alternatively, the overtaking-affecting parameter may comprise a length $L_{preceding}$ of the preceding vehicle 7. The preceding vehicle length $L_{preceding}$ may be represented by a constant, such as e.g. a maximum allowed length of a vehicle; according to an example however, the preceding vehicle length $L_{preceding}$ may be represented by a variable, e.g. derivable from the preceding vehicle 7 itself e.g. via vehicle-to-vehicle communication, and/or derivable from a database—e.g. comprised in a backend system such as e.g. a commonly known automotive cloud—holding information of vehicle lengths e.g. based on registration number and/or vehicle type, which may be gathered by the host vehicle 2 e.g. with support from an image capturing system such as the optional mono camera 3 discussed above.

Furthermore, additionally or alternatively, the overtaking-affecting parameter may comprise a safety distance margin $D_{margin}$ defining the nearest the host vehicle 2 is allowed to come the preceding vehicle 7. The safety distance margin $D_{margin}$ may be represented by a constant; according to an example, however, the safety distance margin $D_{margin}$ may be represented by a variable, e.g. reflecting a driving style of the driver and/or a determined traveling, environmental and/or traffic situation, which may be derivable e.g. from— e.g. known—co-systems such as nodes and/or electronic control modules, ECUs, on-board the host vehicle 2. The safety distance margin $D_{margin}$ may accordingly range from a few tens of millimeters up to several tens of meters.

The minimum overtaking speed may be derived from the determined remaining distance $D_{remaining}$ in the overtaking lane 42, the determined delta distance $D_{delta}$ between the host vehicle 2 and the preceding vehicle 7, the determined vehicle speed of the preceding vehicle 7, and the overtaking-affecting parameter, in any feasible manner.

According to an example, the following equation could serve as basis:

$$V_{overtake}=V_{preceding}*D_{remaining}/(D_{remaining}-D_{delta}-k_{affect}) \quad (4)$$

where
  $V_{preceding}$=preceding vehicle speed,
  $D_{remaining}$=remaining distance of overtaking lane 42,
  $D_{delta}$=delta distance between host vehicle 2 and preceding vehicle 7,
  $K_{affect}$=overtaking-affecting parameter, and
  $V_{overtake}$=minimum host vehicle overtaking speed It is to be understood that it may be assumed that the host vehicle 2 and the preceding vehicle 7 during the minimum overtaking speed estimating process—and the preceding vehicle 7 also during a potential overtaking maneuver— keep a respective essentially constant speed and/or acceleration.

The phrase "determining based on said remaining distance, said delta distance, said preceding vehicle speed, and an overtaking-affecting parameter" a minimum overtaking speed may refer to "determining based on equations and/or algorithms comprising said remaining distance, said delta distance, said preceding vehicle speed, and an overtaking— affecting parameter" a minimum overtaking speed. "Determining based on", on the other hand, may in this context refer to "calculating based on". Moreover, "determining a minimum overtaking speed" may refer to "determining a current—or essentially current—minimum overtaking speed" and/or "determining at—or essentially at—said time point a minimum overtaking speed". "Minimum overtaking speed" may refer to "target speed" and/or merely "overtaking speed". The phrase "for overtaking said preceding vehicle in the remaining distance of the overtaking lane", on the other hand, may refer to "for overtaking said preceding vehicle before reaching an end of said remaining distance". A "length" of the host/preceding vehicle may refer to a "determined length" of the host/preceding vehicle and/or a "derived length" of the host/preceding vehicle. According to an example, the phrase "a length of said host vehicle" may refer to "a length of the host vehicle derived from a vehicle equipage length determining system", whereas, in a similar manner, the phrase "a length of said preceding vehicle" may refer to "a length of the preceding vehicle determined based on a registration number and/or a vehicle type derived from an image capturing system e.g. a mono camera on-board said host vehicle". The phrase "the nearest said host vehicle is allowed to come said preceding vehicle", on the other hand, may refer to "the nearest said host vehicle is allowed to come close to said preceding vehicle", "the nearest said host vehicle is allowed to come a rear end of said preceding vehicle" and/or "the nearest said host vehicle is allowed to come said preceding vehicle during a potential overtaking maneuver".

The overtaking estimating system 1 may—e.g. by means of an optional overtaking speed communicating unit 106 (shown in FIG. 2)—be adapted and/or configured for communicating estimated overtaking speed data reflecting the minimum overtaking speed to an action-taking system 9 on-board the host vehicle 2. Thereby, the estimated minimum overtaking speed may—via the estimated overtaking speed data—be provided to e.g. a human-machine interface, HMI, on-board the host vehicle 2, for instance to inform e.g. a potential driver of the host vehicle 2 of said minimum overtaking speed, and/or provided as input to an—e.g. known—advanced driver-assistance system, ADAS, and/ or—e.g. known—automated driving, AD, system of the host vehicle 2.

The estimated overtaking speed data may be communicated in any arbitrary manner feasible, e.g. via wire and/or wirelessly, whereas the action-taking system 9 may refer to any arbitrary system 9 on-board the host vehicle 2 feasible for the implementation at hand. For instance, the action-taking system 9 may comprise—and/or refer to—a human machine interface, HMI interface, such as e.g. a display and/or loudspeaker e.g. adapted to present—and/or prompt e.g. a potential vehicle driver with—the determined minimum overtaking speed, and/or comprise—and/or refer to— an ADAS/AD system e.g. adapted to at least partly control overtaking maneuvers. The optional HMI interface may for instance be comprised in—and/or be mounted to—the host vehicle 2, and/or be comprised in a user device such as e.g. a smartphone carried on-board the host vehicle 2.

The phrase "communicating" estimated overtaking speed data may refer to "communicating by wire and/or wirelessly" estimated overtaking speed data, whereas "estimated overtaking speed data" may refer to "one or more estimated overtaking speed signals and/or messages". Estimated overtaking speed data "reflecting the minimum overtaking speed", on the other hand, may refer to estimated overtaking speed data "comprising the determined minimum overtaking speed". According to an example, the phrase "action-taking system on-board said host vehicle" may refer to "action-taking system on-board said host vehicle, said action-taking system comprising an HMI interface and/or an ADAS/AD system".

Figure 2:
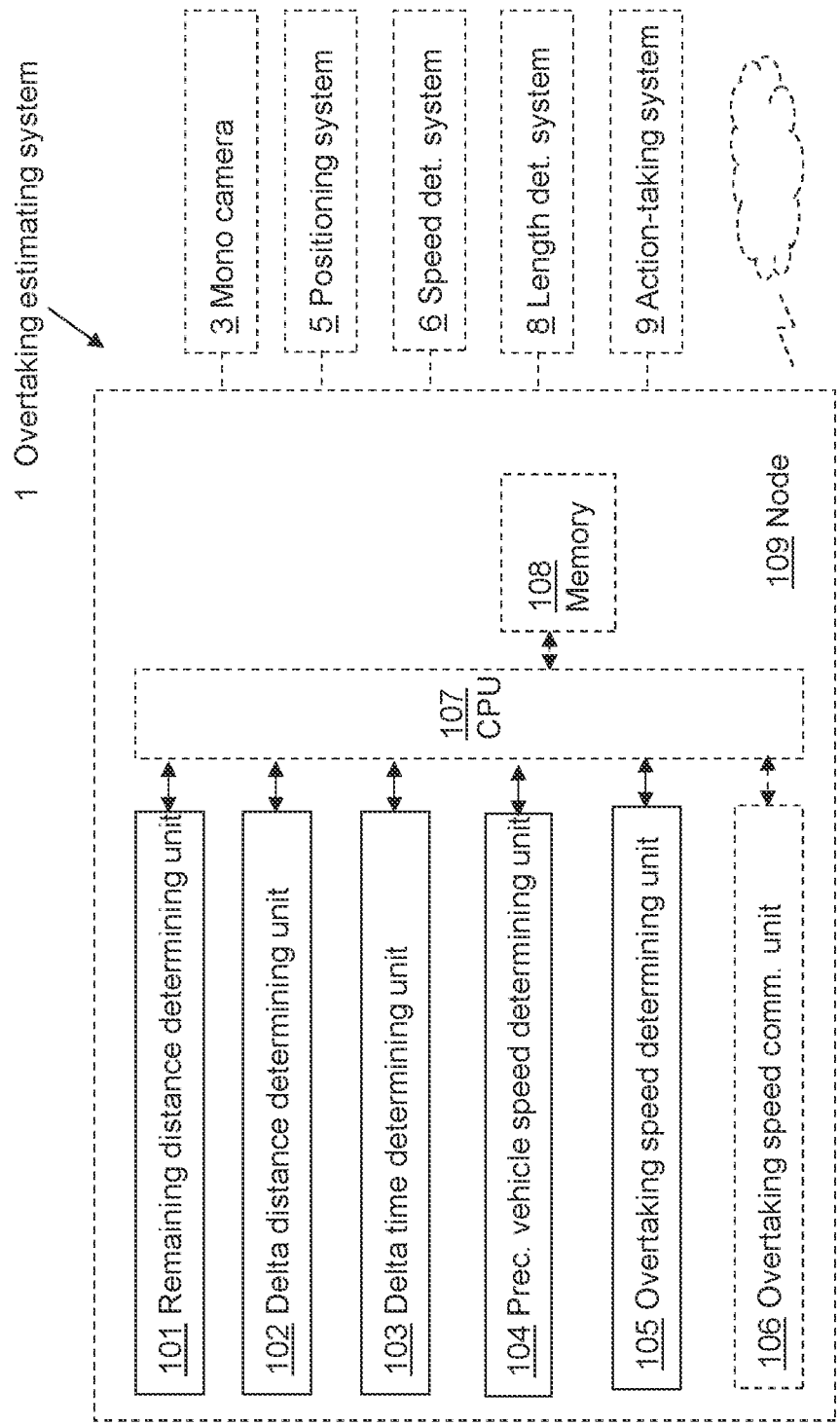
FIG. 2 is a schematic block diagram illustrating an exemplifying overtaking estimating system according to embodiments of the disclosure.

As further shown in FIG. 2, which is a schematic block diagram illustrating an exemplifying overtaking estimating system 1 according to embodiments of the disclosure, the overtaking estimating system 1 comprises a remaining distance determining unit 101, a delta distance determining unit 102, a delta time determining unit 103, a preceding vehicle speed determining unit 104, an overtaking speed determining unit 105 and an optional overtaking speed communicating unit 106, all of which already have been described in greater detail above. Furthermore, the embodiments herein for estimation of a minimum overtaking speed of a vehicle may be implemented through one or more processors, such as a processor 107, here denoted CPU, together with computer program code for performing the functions and actions of the embodiments herein. Said program code may also be provided as a computer program product, for instance in the form of a data carrier carrying computer program code for performing the embodiments herein when being loaded into the overtaking estimating system 1. One such carrier may be in the form of a CD ROM disc and/or a hard drive, it is however feasible with other data carriers. The computer program code may furthermore be provided as pure program code on a server and downloaded to the overtaking estimating system 1. The overtaking estimating system 1 may further comprise a memory 108 comprising one or more memory units. The memory 108 may be arranged to be used to store e.g. information, and further to store data, configurations, scheduling, and applications, to perform the methods herein when being executed in the overtaking estimating system 1. For instance, the computer program code may be implemented in the firmware, stored in FLASH memory 108, of an embedded processor 107, and/or downloaded wirelessly e.g. from an off-board server. Furthermore, the remaining distance determining unit 101, the delta distance determining unit 102, the delta time determining unit 103, the preceding vehicle speed determining unit 104, the overtaking speed determining unit 105, the optional overtaking speed communicating unit 106, the optional processor 107 and/or the optional memory 108 may at least partly be comprised in one or more nodes 109 e.g. ECUs of the vehicle 2. Those skilled in the art will also appreciate that said units 101, 102, 103, 104, 105, 106 described above may refer to a combination of analog and digital circuits, and/or one or more processors configured with software and/or firmware, e.g. stored in a memory such as the memory 108, that when executed by the one or more processors such as the processor 107 perform as described herein. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further shown in FIG. 2 is the optional mono camera 3, the optional positioning system 5, the optional speed determining system 6, the optional vehicle equipage length determining system 8, the optional action-taking system 9 and an optional automotive cloud, all of which have been discussed in greater detail above.

Figure 3:
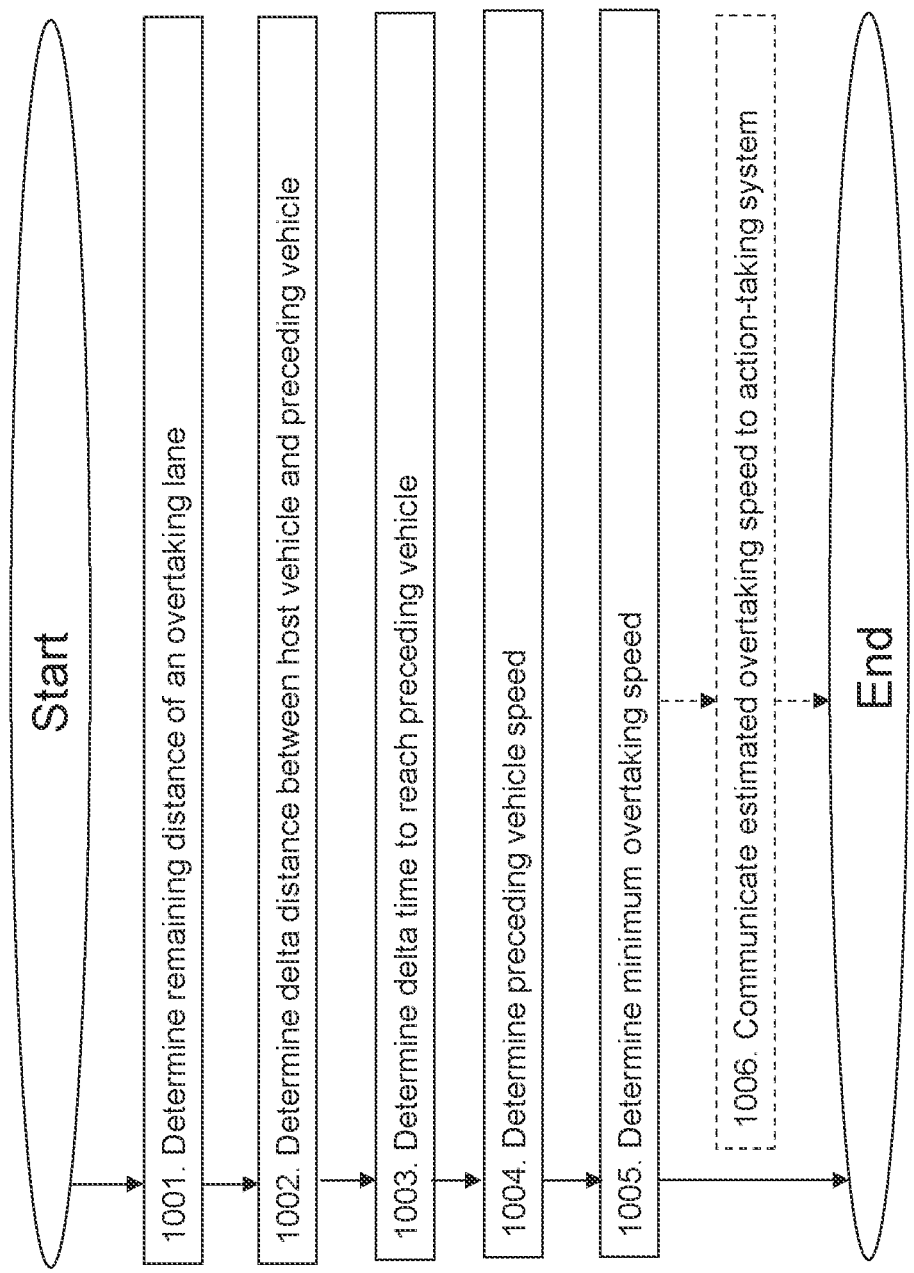
FIG. 3 is a flowchart depicting an exemplifying method performed by an overtaking estimating system according to embodiments of the disclosure.

FIG. 3 is a flowchart depicting an exemplifying method performed by an overtaking estimating system 1 according to embodiments of the disclosure. Said method is for estimation of a minimum overtaking speed of a vehicle. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Actions 1002-1004 may be performed simultaneously with and/or prior to Action 1001, and furthermore, Actions 1002-1004 may be performed simultaneously and/or in an alternate order.

Action 1001

In Action 1001, the overtaking estimating system 1 determines in view of a host vehicle 2—e.g. with support from the remaining distance determining unit 101—a remaining distance $D_{remaining}$ of an overtaking lane 42 contiguous to a driving lane 41 of the host vehicle 2.

Action 1002

In Action 1002, the overtaking estimating system 1 determines—e.g. with support from the delta distance determining unit 102—a delta distance $D_{delta}$ between the host vehicle 2 and a preceding vehicle 7 positioned in the host vehicle driving lane 41.

Optionally, Action 1002 of determining the delta distance $D_{delta}$ may comprise determining said delta distance based on image data derived from a mono camera 3 adapted to capture surroundings of the host vehicle 2.

Further optionally, Action 1002 of determining the delta distance $D_{delta}$ may comprise determining said delta distance based on a monocular depth reconstruction model. The monocular depth reconstruction model may further comprise a convolutional neural network, CNN.

Action 1003

In Action 1003, the overtaking estimating system 1 determines—e.g. with support from the delta time determining unit 103—a delta time for the host vehicle 2 to reach the preceding vehicle 7.

Optionally, Action 1003 of determining the delta time may comprise determining said delta time based on image data derived from a mono camera 3 adapted to capture surroundings of the host vehicle 2.

Further optionally, Action 1003 of determining the delta time may comprise determining said delta time based on image data captured—by said mono camera 3—at two or more different points in time.

Action 1004

In Action 1004, the overtaking estimating system 1 determines based on the delta distance $D_{delta}$, the delta time and a determined host vehicle speed—e.g. with support from the preceding vehicle speed determining unit 104—a speed of the preceding vehicle 7.

Action 1005

In Action 1005, the overtaking estimating system 1 determines based on the remaining distance $D_{reminaing}$, the delta distance $D_{delta}$, the preceding vehicle speed, and an overtaking-affecting parameter—e.g. with support from the overtaking speed determining unit 105—a minimum overtaking speed of the host vehicle 2 for overtaking the preceding vehicle 7 in the remaining distance $D_{remaining}$ of the overtaking lane 42.

Action 1006

In optional Action 1006, the overtaking estimating system 1 may communicate—e.g. with support from the optional overtaking speed communicating unit 106—estimated overtaking speed data reflecting the minimum overtaking speed to an action-taking system 9 on-board the host vehicle 2.

The action-taking system 9 may comprise an HMI interface and/or an ADAS/AD system.

Optionally, the overtaking-affecting parameter may comprise a length $L_{host}$ of the host vehicle 2. Additionally or alternatively, the overtaking-affecting parameter may comprise a length $L_{preceding}$ of the preceding vehicle 7. Moreover, additionally or alternatively, the overtaking-affecting parameter may comprise a safety distance margin $D_{margin}$ defining the nearest the host vehicle 2 is allowed to come the preceding vehicle 7.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by an overtaking estimating system for estimation of a minimum overtaking speed of a host vehicle, the method comprising:
   determining in view of a host vehicle a remaining distance ($D_{remaining}$) of a fixed distance overtaking lane contiguous to a driving lane of the host vehicle;
   determining a delta distance ($D_{delta}$) between the host vehicle and a preceding vehicle positioned in the host vehicle driving lane;
   determining a delta time for the host vehicle to reach the preceding vehicle;
   determining based on the delta distance ($D_{delta}$), the delta time and a determined host vehicle speed, a speed of the preceding vehicle;
   determining based on the remaining distance ($D_{remaining}$), the delta distance ($D_{delta}$), the preceding vehicle speed, and an overtaking-affecting parameter, a minimum overtaking speed of the host vehicle for overtaking the preceding vehicle in the remaining distance ($D_{remaining}$) of the overtaking lane; and
   communicating estimated overtaking speed data reflecting the minimum overtaking speed to an action-taking system on-board the host vehicle, the action-taking system including an Advanced Driver Assistance System (ADAS)/Automated Driving (AD) system configured to at least partly control overtaking maneuvers, the communicating causing the ADAS/AD to at least partly control an overtaking maneuver of the host vehicle;
   the determining at least one of the delta distance ($D_{delta}$) and the delta time including determining at least one of the delta distance ($D_{delta}$) and the delta time based on image data derived from a mono camera configured to capture surroundings of the host vehicle; and
   the determining the delta distance ($D_{delta}$) including determining the delta distance ($D_{delta}$) based on a monocular depth reconstruction model.

2. The method according to claim 1, wherein the action taking system further comprises a Human Machine Interface (HMI) interface.

3. The method according to claim 1, wherein the overtaking-affecting parameter comprises at least one of:
   a length ($L_{host}$) of the host vehicle;
   a length ($L_{preceding}$) of the preceding vehicle; and
   a safety distance margin ($D_{margin}$) defining the nearest the host vehicle is allowed to come the preceding vehicle.

4. The method according to claim 1, wherein determining the delta time comprises determining the delta time based on image data captured at two or more different points in time.

5. The method according to claim 1, where the monocular depth reconstruction model comprises a convolutional neural network.

6. An overtaking estimating system for estimation of a minimum overtaking speed of a host vehicle, the overtaking estimating system comprising:
   a remaining distance determining unit for determining in view of a host vehicle a remaining distance ($D_{remaining}$) of a fixed distance overtaking lane contiguous to a driving lane of the host vehicle;
   a delta distance determining unit for determining a delta distance ($D_{delta}$) between the host vehicle and a preceding vehicle positioned in the host vehicle driving lane;
   a delta time determining unit for determining a delta time for the host vehicle to reach the preceding vehicle;
   a preceding vehicle speed determining unit for determining based on the delta distance (Ddelta), the delta time and a determined host vehicle speed, a speed of the preceding vehicle;
   an overtaking speed determining unit for determining based on the remaining distance ($D_{remaining}$), the delta distance ($D_{delta}$), the preceding vehicle speed, and an overtaking-affecting parameter, a minimum overtaking speed of the host vehicle for overtaking the preceding vehicle in the remaining distance ($D_{remaining}$) of the overtaking lane; and
   communicate estimated overtaking speed data reflecting the minimum overtaking speed to an action-taking system on-board the host vehicle, the action-taking system including an Advanced Driver Assistance System (ADAS)/Automated Driving (AD) system configured to at least partly control overtaking maneuvers, the communicating causing the ADAS/AD to at least partly control an overtaking maneuver of the host vehicle;
   the determination of at least one of the delta distance ($D_{delta}$) and the delta time including determining at least one of the delta distance ($D_{delta}$) and the delta time based on image data derived from a mono camera configured to capture surroundings of the host vehicle; and
   the determination of the delta distance ($D_{delta}$) including determining the delta distance ($D_{delta}$) based on a monocular depth reconstruction model.

7. The overtaking estimating system according to claim 6, wherein the overtaking-affecting parameter comprises at least one of:
   a length ($L_{host}$) of the host vehicle;
   a length ($L_{preceding}$) of the preceding vehicle; and
   a safety distance margin ($D_{margin}$) defining the nearest the host vehicle is allowed to come the preceding vehicle.

8. The overtaking estimating system according to claim 6, wherein the delta time determining unit is configured to determine the delta time based on image data captured at two or more different points in time.

9. The overtaking estimating system according to claim 6, wherein the overtaking estimating system is comprised in a vehicle.

10. A computer storage medium storing an executable computer program that, when executed, causes one of a computer and a processor to perform a method comprising:
    determining in view of a host vehicle a remaining distance ($D_{remaining}$) of a fixed distance overtaking lane contiguous to a driving lane of the host vehicle;
    determining a delta distance ($D_{delta}$) between the host vehicle and a preceding vehicle positioned in the host vehicle driving lane;
    determining a delta time for the host vehicle to reach the preceding vehicle;
    determining based on the delta distance ($D_{delta}$), the delta time and a determined host vehicle speed, a speed of the preceding vehicle;
    determining based on the remaining distance ($D_{remaining}$), the delta distance ($D_{delta}$), the preceding vehicle speed, and an overtaking-affecting parameter, a minimum overtaking speed of the host vehicle for overtaking the preceding vehicle in the remaining distance ($D_{remaining}$) of the overtaking lane; and
    communicating estimated overtaking speed data reflecting the minimum overtaking speed to an action-taking system on-board the host vehicle, the action-taking system including an Advanced Driver Assistance System (ADAS)/Automated Driving (AD) system configured to at least partly control overtaking maneuvers, the communicating causing the ADAS/AD to at least partly control an overtaking maneuver of the host vehicle;
    communicating estimated overtaking speed data reflecting the minimum overtaking speed to an action-taking system on-board the host vehicle, the action-taking system including an Advanced Driver Assistance System (ADAS)/Automated Driving (AD) system configured to at least partly control overtaking maneuvers, the communicating causing the ADAS/AD to at least partly control an overtaking maneuver of the host vehicle;
    the determining at least one of the delta distance ($D_{delta}$) and the delta time including determining at least one of the delta distance ($D_{delta}$) and the delta time based on image data derived from a mono camera configured to capture surroundings of the host vehicle; and
    the determining the delta distance ($D_{delta}$) including determining the delta distance ($D_{delta}$) based on a monocular depth reconstruction model.

11. The computer storage medium according to claim 10, wherein the action taking system comprises a Human Machine Interface (HMI) interface.

12. The computer storage medium according to claim 10, wherein the overtaking-affecting parameter comprises at least one of:
    a length ($L_{host}$) of the host vehicle;
    a length ($L_{preceding}$) of the preceding vehicle; and
    a safety distance margin ($D_{margin}$) defining the nearest the host vehicle is allowed to come the preceding vehicle.

* * * * *